United States Patent
Chung

(10) Patent No.: US 11,846,726 B2
(45) Date of Patent: Dec. 19, 2023

(54) METHOD AND DEVICE FOR IDENTIFYING OBJECTS DETECTED BY A LIDAR DEVICE

(71) Applicant: WeRide Corp., Sunnyvale, CA (US)

(72) Inventor: Ji Yoon Chung, Sunnyvale, CA (US)

(73) Assignee: WERIDE CORP., Sunnyvale, CA (US)

( * ) Notice: Subject to any disclaimer, the term of this patent is extended or adjusted under 35 U.S.C. 154(b) by 674 days.

(21) Appl. No.: 16/932,845

(22) Filed: Jul. 20, 2020

(65) Prior Publication Data
US 2021/0018596 A1    Jan. 21, 2021

Related U.S. Application Data

(60) Provisional application No. 62/876,760, filed on Jul. 21, 2019.

(51) Int. Cl.
*G01S 7/48*    (2006.01)
*G01S 7/487*    (2006.01)
*G01S 17/10*    (2020.01)

(52) U.S. Cl.
CPC .......... *G01S 7/4802* (2013.01); *G01S 7/4808* (2013.01); *G01S 7/4873* (2013.01); *G01S 17/10* (2013.01)

(58) Field of Classification Search
CPC ...... G01S 7/4802; G01S 7/4808; G01S 7/487; G01S 7/4873; G01S 7/4876; G01S 7/48; G01S 2007/4975
See application file for complete search history.

(56) References Cited

U.S. PATENT DOCUMENTS 9,851,202 B2 * 12/2017 Choiniere ............... G01S 17/08
2019/0056504 A1 * 2/2019 Hartman ................. G01S 17/89

OTHER PUBLICATIONS

Rasshofer, R. H., Spies, M., and Spies, H., Influences of weather phenomena on automotive laser radar systems, 2011, Adv. Radio Sci., 9, 49-60, https://doi.org/10.5194/ars-9-49-2011.*

* cited by examiner

*Primary Examiner* — Yuqing Xiao
*Assistant Examiner* — Byron H Lowry
(74) *Attorney, Agent, or Firm* — Jun He Law Offices P.C.; James J. Zhu

(57) ABSTRACT

An object identifying method is provided. The method comprises: acquiring detection data associated with a detection signal, wherein the detection data comprises a transmission time of the detection signal transmitted by a LiDAR device; acquiring reflection data associated with a reflection signal of the detection signal reflected by an object at an object distance from the LiDAR device, and the reflection data comprises a receipt time of the reflection signal and an intensity of the reflection signal; and determining whether the object is an interference by comparing the intensity of the reflection signal with a distance-dependent threshold intensity.

13 Claims, 7 Drawing Sheets

METHOD AND DEVICE FOR IDENTIFYING OBJECTS DETECTED BY A LIDAR DEVICE

TECHNICAL FIELD

The present disclosure generally relates to a method and device for identifying objects detected by a sensor, more particularly, to identifying objects detected by a LiDAR device.

BACKGROUND

The acquisition of information of objects in a real-world environment is of interest in many industries. A plurality of types of sensors can be used for obtaining the information of objects in a real-world environment, such as Light Detection and Ranging ("LiDAR") devices and the like. Recent advances in scanning technology, such as LiDAR scanning, have resulted in the ability to collect billions of point samples on physical surfaces of objects. A typical LiDAR sensor includes a source of optical radiation and an optical detection device associated with the source. The source of optical radiation, for example, a laser source, emits light towards a region, and the optical detection device, which may include one or more optical detectors or an array of optical detectors, receives reflected light from the region and encodes the reflected light in an electronic readable format to identify and generate information associated with one or more target objects in the region.

The developing autonomous vehicle industry also utilizes cameras and LiDAR sensors for object detection and vehicle navigation. Generally, these sensors are mounted on an exterior of a vehicle, for example, on a roof and/or a side view mirror of the vehicle. However, detections of such cameras and LiDAR sensors may become untrustworthy due to certain interferences in the environment, such as raindrops, snowflakes and dusts in the air, which may be wrongly interpreted as obstructions. Therefore, there is a need for further improvement in identifying such interferences detected by a LiDAR device.

SUMMARY

According to a first aspect of embodiments of the present disclosure, an object identifying method is provided. The object identifying method includes: acquiring detection data associated with a detection signal, wherein the detection data includes a transmission time of the detection signal transmitted by a LiDAR device; acquiring reflection data associated with a reflection signal of the detection signal reflected by an object at an object distance from the LiDAR device, and the reflection data includes a receipt time of the reflection signal and an intensity of the reflection signal; and determining whether the object is an interference by comparing the intensity of the reflection signal with a distance-dependent threshold intensity.

According to a second aspect of embodiments of the present disclosure, a device for identifying an object is provided. The device includes: a processor; and a memory configured to store an instruction executable by the processor; wherein the processor is configured to: acquire detection data associated with a detection signal, wherein the detection data includes a transmission time of the detection signal transmitted by a LiDAR device; acquire reflection data associated with a reflection signal of the detection signal reflected by an object at an object distance from the LiDAR device, and the reflection data includes a receipt time of the reflection signal and an intensity of the reflection signal; and determine whether the object is an interference by comparing the intensity of the reflection signal with a distance-dependent threshold intensity.

According to a third aspect of embodiments of the present disclosure, a non-transitory computer readable storage medium is provided. The non-transitory computer readable storage medium has stored therein instructions that, when executed by a processor, causes the processor to perform a method of identifying an object. The method includes: acquiring detection data associated with a detection signal, wherein the detection data includes a transmission time of the detection signal transmitted by a LiDAR device; acquiring reflection data associated with a reflection signal of the detection signal reflected by an object at an object distance from the LiDAR device, and the reflection data includes a receipt time of the reflection signal and an intensity of the reflection signal; and determining whether the object is an interference by comparing the intensity of the reflection signal with a distance-dependent threshold intensity.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

BRIEF DESCRIPTION OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

The same reference numbers will be used throughout the drawings to refer to the same or like parts.

DETAILED DESCRIPTION OF THE PREFERRED EMBODIMENTS

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

In this application, the use of the singular includes the plural unless specifically stated otherwise. In this application, the use of "or" means "and/or" unless stated otherwise. Furthermore, the use of the term "including" as well as other forms such as "includes" and "included" is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
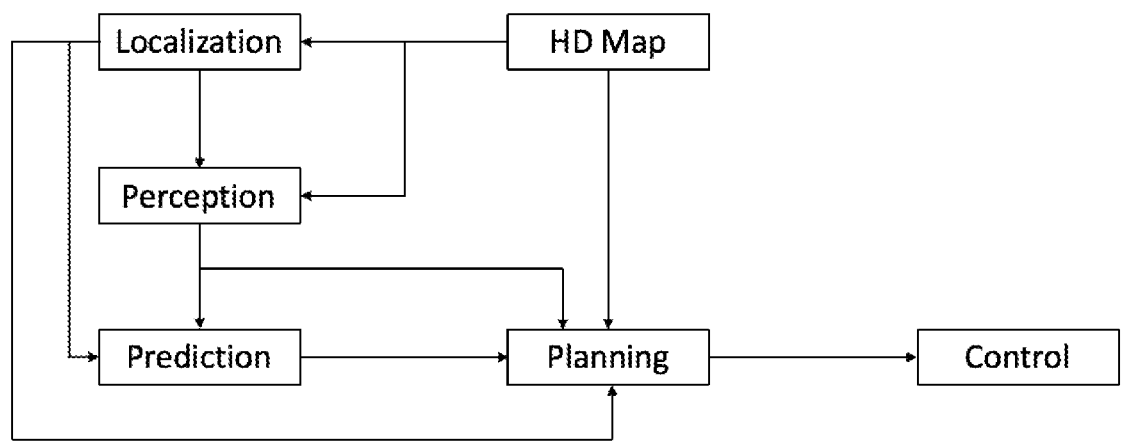
FIG. 1 depicts a representative autonomous driving system.

Autonomous vehicles (also known as driverless cars, self-driving cars or robot cars) are capable of sensing its environment and navigating without human input. FIG. 1 illustrates an exemplary autonomous vehicle system that comprises functional subsystems, or modules, that work collaboratively to generate signals for controlling a vehicle mounted with the autonomous vehicle system.

Referring to FIG. 1, a perception module of the autonomous driving system is configured to sense the surrounding of the autonomous vehicle using sensors such as cameras, radar devices and LiDAR devices and to identify the objects around the autonomous vehicle. The sensor data generated by the sensors is interpreted by the perception module to perform different perception tasks, such as classification, detection, tracking and segmentation. Machine learning technologies, such as convolutional neural networks, have been used to interpret the sensor data. Technologies such as Kalman filter have been used to fuse the sensor data generated by different sensors for the purposes of accurate perception and interpretation.

However, the sensors of the perception module, which include cameras that pick out road dividers or LiDAR devices, may become untrustworthy in wet weather by wrongly interpreting tiny objects such as raindrops or snowflakes as obstructions that may affect driving on the road, although these object are too small to be avoided. The method and device of the present invention is provided to solve the above problem, especially in a system using LiDAR devices.

A LiDAR device may illuminate a target with laser light using one or more transmitters and receives reflected light that are then detected by one or more receivers, so as to measure a distance to the target. Then, differences in laser return times and wavelengths can be used to generate digital 3D representations of the target. In an example, determining the distance between the LiDAR device and the target involves measurement of time of flight (ToF) of laser light from the transmitter to the receiver of the LiDAR device.

Figure 2:
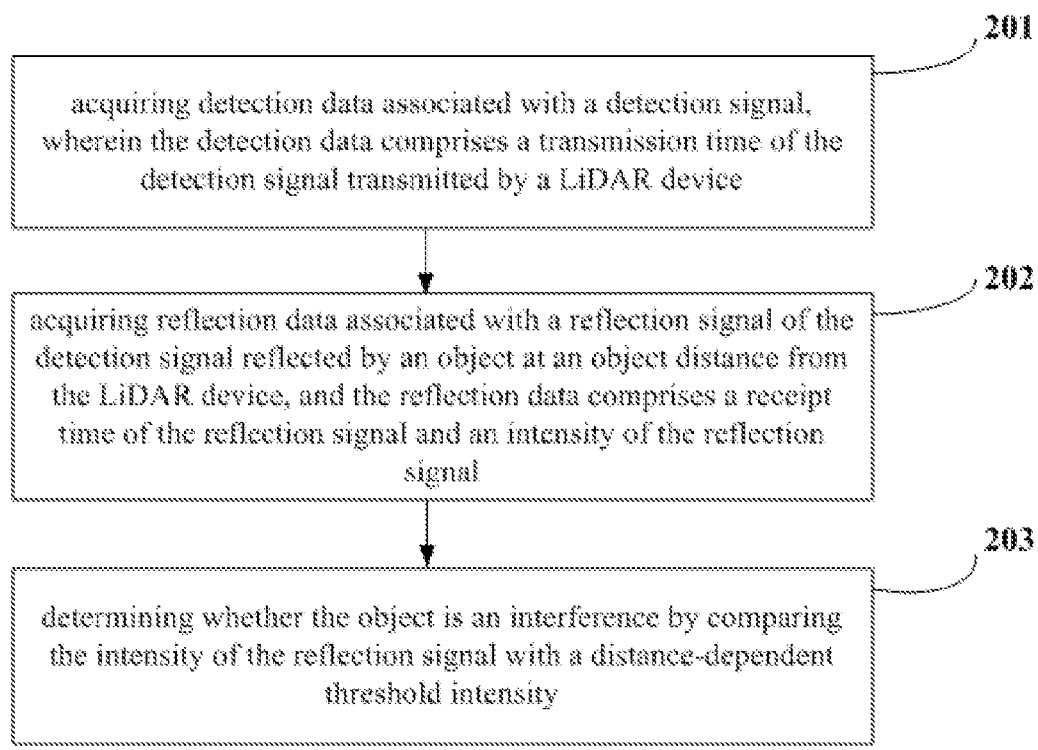
FIG. 2 depicts a flow chart of a process for identifying an object detected by a LiDAR device according to one embodiment of the present disclosure.

FIG. 2 depicts a flow chart of an exemplary process 200 for identifying an object detected by a LiDAR device according to one embodiment of the present disclosure. Referring to FIG. 2, in step 201, detection data associated with a detection signal transmitted by a LiDAR device is acquired, which includes a transmission time of the detection signal. The detection signal is, for example, ultraviolet, visible, or near infrared light. In an example, the LiDAR device includes a transmitter having one or more light sources, and thus the detection signal includes one or more light beams of ultraviolet, visible, or near infrared light transmitted by these light sources. In this case, a turn-on time of the light sources is recorded as the transmission time of the detection signal. In an example, the detection data may also include other information, attributes or aspects of the detection signal, such as an intensity of the detection signal or a direction of the detection signal relative to the transmitter.

In step 202, reflection data associated with a reflection signal of the detection signal is acquired. The reflection signal is a signal reflected by an object at an object distance from the LiDAR device, such as a reflected light of the light beam previously transmitted by the LiDAR device at the transmission time. The object distance herein refers to a distance between the object and the LiDAR device. The reflection data includes a time when the reflection signal is received by the receiver of the LiDAR device and/or an intensity of the reflection signal when it is received. In an example, the intensity of the reflection signal can be an amplitude of the reflection signal, like an amplitude of the reflected ultraviolet, visible, or near infrared light. In another example, the intensity of the reflection signal can be a pulse width of the reflection signal, such as a pulse width of the reflected ultraviolet, visible, or near infrared light. In yet another example, the intensity of the reflection signal can be a combination of the amplitude and the pulse width of the reflection signal, for example, a product of the amplitude and the pulse width. It can be appreciated that other attributes or aspects of the reflected light can be collected or sampled and included in the reflection data as desired.

In step 203, in case that the reflection data contains intensity data, the acquired intensity of the reflection signal is compared with a distance-dependent threshold intensity, so as to determine whether the detected object is an interference, such as a raindrop, dust, snowflake and the like. The interference herein refers to an object with a light weight that may not affect the normal driving of a vehicle or an object with a small size that may not affect the feeling of a passenger on the vehicle under certain circumstances, even if it crashes into the vehicle when the vehicle is driving. In an example, the distance between the object and the LiDAR device (hereinafter "an object distance") is determined based on the Time-of-Flight ("TOF") principle. That is, the object distance is calculated based on the detection data and the reflection data, specifically, the transmission time of the detection signal and the receipt time of the reflection signal. After that, a distance-dependent threshold intensity, which may vary with the object distance, can be calculated based on the object distance. The calculation method of the distance-dependent threshold intensity will be described below with reference to the embodiment shown in FIG. 4.

Figure 3:
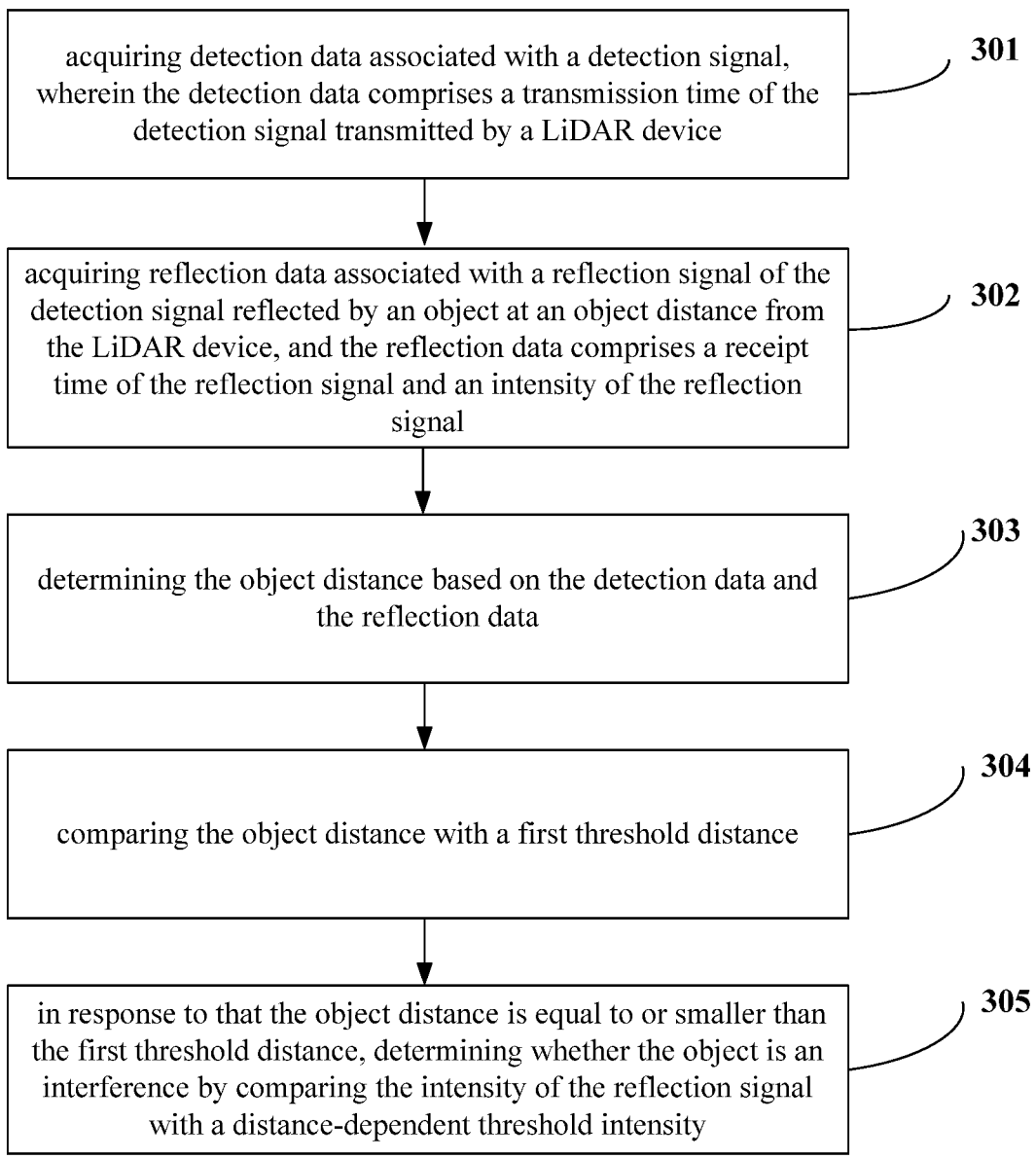
FIG. 3 depicts a flow chart of another process for identifying an object detected by a LiDAR device according to one embodiment of the present disclosure.

FIG. 3 depicts a flow chart of another process 300 for identifying an object detected by a LiDAR device according to one embodiment of the present disclosure. Referring to FIG. 3, in step 301, detection data associated with a detection signal transmitted by a LiDAR device is acquired, which includes a transmission time of the detection signal. In step 302, reflection data associated with a reflection signal of the detection signal is acquired. These steps are corresponding to the steps 201 and 202 of process 200, and thus will not be detailed again here.

In step 303, the distance between the object and the LiDAR device is determined based on the detection data and the reflection data. In an example, the distance is determined based on the Time-of-Flight principle. Specifically, the distance is calculated based on the acquired transmission time of the detection signal, the receipt time of the reflection signal and the speed of the signal, i.e. the speed of light. In step 304, the object distance determined in step 303 is compared with a first threshold distance. In an example, the first threshold distance is a predetermined distance which may be an empirical distance. In an example, the first threshold distance is related to the capability or performance of the LiDAR device itself, such as a light transmission power of the LiDAR device, the wavelength of the transmitted light beam and the like. In an example, the first threshold distance is predetermined in consideration of the light transmission power of the LiDAR device and/or the wavelength of the transmitted laser light. In an example, the first threshold distance is a value ranging from 0.1 meter to 30 meters, preferably, a value selected from 10 meters to 25 meters. The first threshold distance defines a range beyond which the influence of interferences, such as a raindrop, dust, snowflake and the like, on the LiDAR device may be less than a desired value and thus can be ignored. In other words, if the object distance is greater than the first threshold distance, there is no need to consider the influence of the reflection signal of the interference like raindrops, dusts or snowflakes.

In step 305, if the comparison result at step 304 shows that the object distance is equal to or smaller than the first threshold distance, the intensity of the reflection signal is compared with a distance-dependent threshold intensity to determine whether the detected object is an interference, such as a raindrop, dust, snowflake and the like. Step 305 is similar to step 203 of the process 200 shown in FIG. 2, and thus will not be detailed again here. With the process during step 305, smaller objects such as raindrops, snowflakes and dusts which are far enough from the LiDAR device may not be considered in subsequent vehicle driving, and thus increases the efficiency of identifying significant objects such as other vehicles, pedestrians detected by the LiDAR device.

Figure 4:
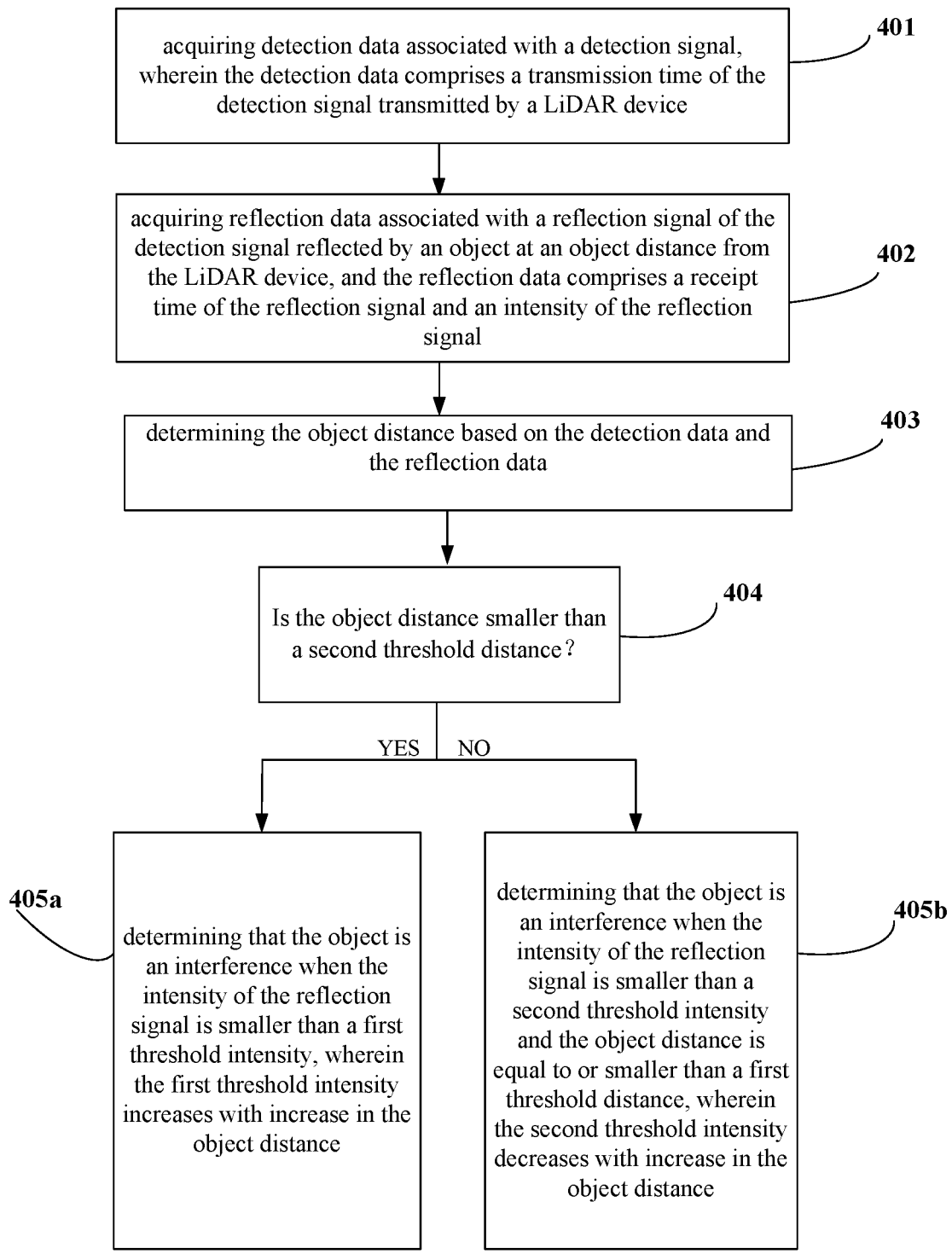
FIG. 4 depicts a flow chart of another process for identifying an object detected by a LiDAR device according to one embodiment of the present disclosure.

FIG. 4 depicts a flow chart of another process 400 for identifying an object detected by a LiDAR device according to one embodiment of the present disclosure. Similar to process 300, in step 401, detection data associated with a detection signal transmitted by a LiDAR device is acquired, which includes a transmission time of the detection signal. In step 402, reflection data associated with a reflection signal of the detection signal is acquired. In step 403, the object distance is determined based on the acquired detection data and the reelection data. Steps 401, 402 and 403 are corresponding to steps 301, 302 and 303, and thus will not be detailed again here.

Referring to FIG. 4, in step 404, the object distance is compared with a second threshold distance. In an example, the second threshold distance is another predetermined distance which may also be an empirical distance or value. In an example, the second threshold distance is related to the design of the LiDAR device itself, for example, a distance between the transmitter and the receiver of the LiDAR device. In an example, the second threshold distance is related to a lateral distance between the transmitter and the receiver of the LiDAR device for implementing the processing 400. Specifically, in an example, the lateral distance is a distance between a center of the optical element of the transmitter and a center of the optical element of the receiver. In another example, the lateral distance is a distance between respective central optical axes of the transmitter and the receiver if the two are positioned parallel to each other. In an example, the lateral distance is a distance between a center point of the transmitter and a center point of the receiver. In an example, the lateral distance is a value ranging from 4 cm to 8 cm. In an example, the second threshold distance is a value ranging from 5 meters to 20 meters, preferably from 5 meters to 10 meters or from 8 meters to 16 meters. In an example, the second threshold distance is also related to the power of the LiDAR device or the wavelength of the transmitted laser light beam since these factors may be related to intensity attenuation during signal propagation in the air, and thus the second threshold distance is predetermined in consideration of the lateral distance, the power of the LiDAR device and/or the wavelength of the transmitted laser light. In an example, a parallax zone can be defined based on the second threshold distance, and a distance between any objects within the parallax zone and the LiDAR device is smaller than the second threshold distance. In an example, the parallax zone is a circular area, whose center is the LiDAR device and radius is equal to the second threshold distance.

Figure 7:
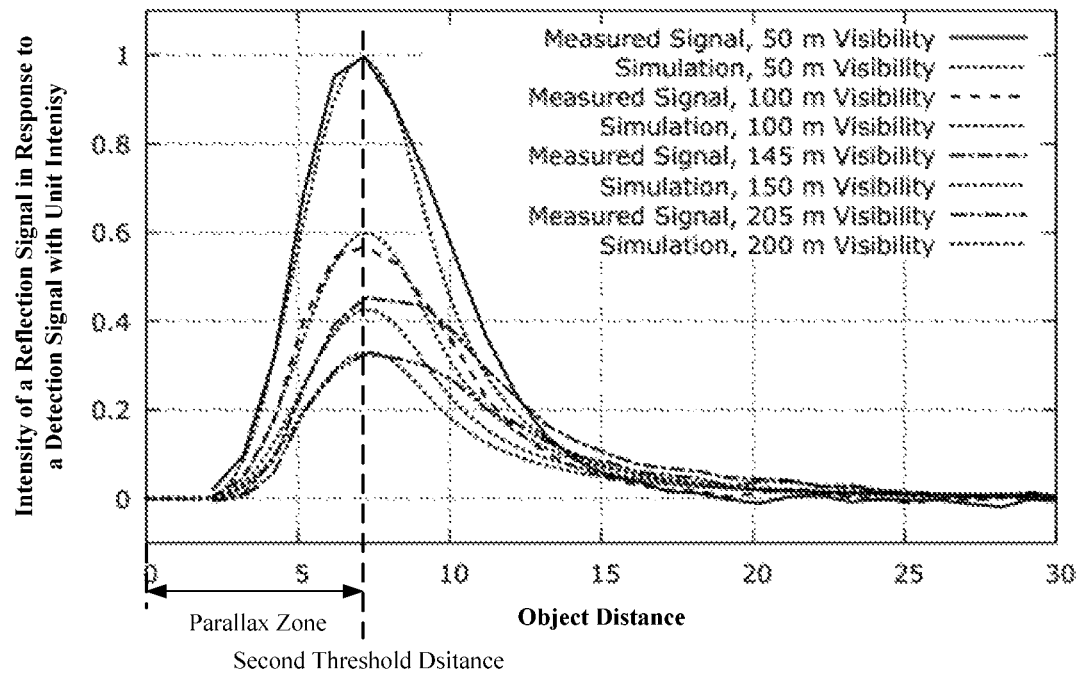
FIG. 7 depicts a graph showing curves of the intensity of a reflection signal over the object distance in different visibilities according to one embodiment of the present disclosure.

FIG. 7 depicts a graph showing curves of the intensity of a reflection signal over the object distance in different visibilities according to one embodiment of the present disclosure. As shown in FIG. 7, the vertical axis represents an intensity of a reflection signal in response to a detection signal with unity intensity, and the horizontal axis represents a distance of an object reflecting the detection signal, i.e. the object distance. Each curve shown in this graph represents a curve of the measured or simulated reflection signal in a specific visibility, such as a visibility of 50 m, 100 m, 145 m, 150 m, 200 m or 205 m. As can be seen, all these curves have a peak intensity corresponding to the same, or nearly the same object distance in the horizontal axis, i.e., the second threshold distance. The intensity of the reflection signal increases as the object distance increases when the object distance is smaller than the second threshold distance, and decreases as the object distance increases when the object distances is equal to or greater than the second threshold distance. The above mentioned steps 404, 405a and 405b are designed in consideration of the specific relationship between the intensity of the reflection signal and the object distances as shown in FIG. 7.

If the object distance is smaller than the second threshold distance, step 405a is performed. The intensity of the reflection signal is compared with a first threshold intensity, wherein the first threshold intensity may increase with an increase in the object distance. And the object is determined as an interference, such as a raindrop, dust, snowflake and the like, when the intensity of the reflection signal is equal to or smaller than the first threshold intensity. In an example, the first threshold intensity is calculated using the following equation: $I_1=A_1*D+B$, wherein $I_1$ is the first threshold intensity, $A_1$ is a first coefficient, D is the object distance, and B is a first preset value. The first coefficient and the first preset value are empirical values. In an example, the first coefficient is from 2 to 30. In an example, the first preset value is from 5 to 50. In an example, the first coefficient and the first preset value are related to the features of the LiDAR device itself, such as the transmission power of the LiDAR device, the wavelength of the laser light beam and the like. As mentioned above, the intensity of the reflection signal may be represented by an amplitude of the reflection signal, a pulse width, or a combination of the amplitude and the pulse width, and thus the first coefficient and the first preset value may be different for different types of the intensity of the reflection signal, respectively.

If the object distance is equal to or greater than the second threshold distance, then step 405*b* is performed. The intensity of the reflection signal is compared with a second threshold intensity, wherein the second threshold intensity may decrease with an increase in the object distance, and the object is determined as an interference, such as a raindrop, dust, snowflake and the like, when the intensity of the reflection signal is smaller than the second threshold intensity. In an example, the second threshold intensity is calculated using the following equation: $I_2=A_2*(D_{max}-D)+C$, wherein $I_2$ is the second threshold intensity, $A_2$ is a second coefficient, $D_{max}$ is the first threshold distance, D is the object distance, and C is a second preset value. The second coefficient and the second preset value are empirical values. In an example, the second coefficient is from 2 to 30. In an example, the second preset value is from 50 to 200. In an example, the second coefficient and the second preset value are related to the features of the LiDAR device itself, such as the transmission power of the LiDAR device, the wavelength of the laser light beam and the like. In an example, the second coefficient and the second preset value may be different for different selection of parameters, such an amplitude, a pulse width, or a combination of the amplitude and the pulse width, as the intensity of the reflection signal.

It can be seen be seen that the first threshold distance is shorter than the second threshold distance, and thus the first or threshold intensity is higher when the object distance is closer to an optimal point between the first threshold distance and the second distance. The optimal point or the optimal distance actually reflects an optimal detection by the LiDAR device taking into account light propagation and some other factors.

In an example, the LiDAR device includes a body that is configured to rotate about an axis. In some examples, the rotation axis is substantially vertical. The body may include or be mounted with various components such as a transmitter including a plurality of light sources and a receiver including a plurality of detectors. By rotating the body with the various components, in some examples, a three-dimensional map of a 360-degree field of view of an environment of the LiDAR device can be determined. Specifically, after transmitting a light beam and receiving a reflected light beam of the transmitted light beam, the LiDAR device may rotate for a preset degree, such as smaller than 5 degrees, preferably smaller than 0.5 degree, and then transmit another light beam for a subsequent detection process for another preset degree spaced apart from the previously detected preset degree by an angle.

Figure 5:
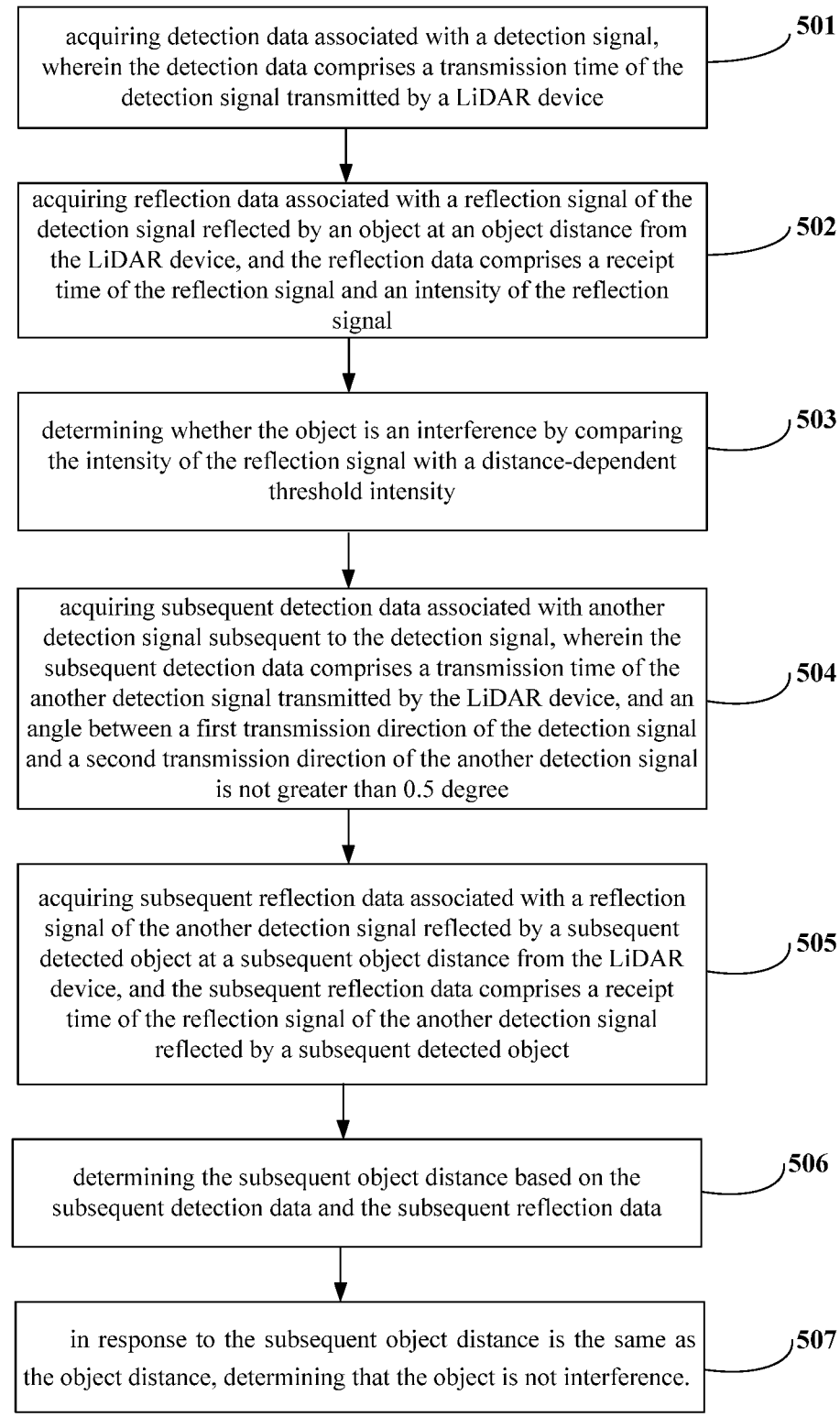
FIG. 5 depicts a flow chart of another process for identifying an object detected by a LiDAR device according to one embodiment of the present disclosure.

FIG. 5 depicts a flow chart of another process 500 for identifying an object detected by a LiDAR device according to one embodiment of the present disclosure. Similar to process 200, in step 501, detection data associated with a detection signal transmitted by a LiDAR device is acquired, which includes a transmission time of the detection signal. In step 502, reflection data associated with a reflection signal of the detection signal is acquired. In step 503, the acquired intensity of the reflection signal is compared with a distance-dependent threshold intensity, so as to determine whether the detected object is an interference, such as a raindrop, dust, snowflake and the like. As can be seen, steps 501, 502 and 503 are respectively corresponding to steps 201, 202 and 203, and thus will not be detailed again here.

Referring to FIG. 5, in step 504, subsequent detection data associated with another detection signal subsequent to the detection signal is acquired, which includes a transmission time of the another detection signal. The detection signal in step 501 is transmitted in a first transmission direction, the another detection signal in step 504 is transmitted in a second transmission direction, and an angle between the first transmission direction and the second transmission direction is equal to or smaller than 5 degrees, preferably smaller than 0.5 degree. In step 505, a subsequent reflection data associated with a reflection signal of the another detection signal reflected by a subsequent detected object at a subsequent object distance is acquired, which includes a time when the reflection signal is received by the LiDAR device and an intensity of the reflection signal at this time. In an example, the subsequent object distance means a distance between the subsequent detected object and the LiDAR device. It should be noted that, steps 504 and 505 are similar to steps 201 and 202, whose specific technical features will not be detailed again here.

In an example, the body of the LiDAR device firstly transmits a detection signal, such as laser light beams, in a first transmission direction, and then receives a reflection signal of the detection signal reflected by an object away from the LiDAR device, so as to generate the detection data and the reflection data associated with steps 501 and 502 of process 500. After that, the body of the LiDAR device rotates for a preset degree or angle, such as smaller than 0.5 degree, then the transmitter on the body transmits another detection signal and the receiver on the body receives a reflection signal of the another detection signal reflected by a subsequent detected object away from the LiDAR device, so as to generate subsequent detection data and subsequent reflection data corresponding to steps 504 and 505 of process 500. It should be noted that the object detected by the detection signal, the subsequent detected object detected by the another detection signal may be different portions of the same object.

Referring to FIG. 5, in step 506, the distance between the subsequent detected object and the LiDAR device (herein also referred to "subsequent object distance") is determined based on the subsequent detection data and the subsequent reflection data. Step 506 is corresponding to step 303 or step 403, which will not be detailed herein. After that, in step 507, the subsequent object distance is compared with the object distance related to step 502. In step 507, if the subsequent object distance is the same as the object distance, it is determined that the object detected by the detection signal is not an interference. In another example, the object is not determined as interferences, if a difference between the subsequent object distance and the object distance is equal to or less than a preset distance difference. The preset distance difference may be an empirical value. In an example, the preset distance difference is selected from 2 cm to 10 cm. By performing steps 504 to 507, a verification process is conducted, so as to confirm whether the determination result of step 503 is correct.

Optionally, when it is determined that the object is an interference in step 507, an additional verification process may be further conducted. Specifically, steps 504 and 505 may be repeated to acquire additional subsequent detection data associated with a third detection signal subsequent to the another detection signal and an additional subsequent reflection data associated with a reflection signal of the third detection signal reflected by a further detected object, wherein the transmission direction of the third detection signal forms an preset angle, such as equal to or smaller than 5 degrees, preferably smaller than 0.5 degree, with the transmission direction of the another detection signal. After acquiring the additional subsequent detection data and additional subsequent reflection data, a further verification process may be performed. That is, steps 506 and 507 are repeated, and if a distance between the further detected object and the LiDAR device is the same as the above-mentioned subsequent object distance, it is determined that the object is not an interference, otherwise, the initially detected object is verified as an interference. In another example, the object is not determined as interferences, if a difference between the distance between the further detected object and the LiDAR device and the subsequent object distance is equal to or less than a preset distance difference. The preset distance difference may be an empirical value. In an example, the preset distance difference is selected from 2 cm to 10 cm. It should be noted that the object detected by the detection signal, the subsequent detected object detected by the another detection signal and the further detected object may be different portions of the same object.

In an example, the body of the LiDAR device firstly transmits a detection signal, such as laser light beams, in a first transmission direction, and then receives a reflection signal of the detection signal reflected by an object away from the LiDAR device, so as to generate the detection data and the reflection data associated with steps 501 and 502 of process 500. After that, the body of the LiDAR device further rotates for a preset degree, such as smaller than 5 degrees, preferably smaller than 0.5 degree, then transmits another detection signal and receives a reflection signal of the another detection signal reflected by a subsequent detected object away from the LiDAR device, so as to generate subsequent detection data and subsequent reflection data associated with steps 504 and 505 of process 500. After these motions, the body of the LiDAR device further rotates for a preset degree in the same direction as before, then transmits third detection signal and receives a reflection signal of the third detection signal reflected by a further detected object away from the LiDAR device, so as to generate the above mentioned additional subsequent detection data and additional subsequent reflection data for further verification.

It should be noted that the sequences of the previously described steps in each process may be changed, and the steps of different process can be combined with each other. For example, in process 300, step 305 may be replaced with steps 404 and 405a/405b of process 400, steps 504 to 507 of process 500 could be added after step 405a/405b, so as to verify the results determined in step 405a or 405b. In an example, the object distance may be firstly compared with the second threshold distance, and then step 405a may be performed if the object distance is smaller than the second threshold distance. After that, the object distance is compared with the first threshold distance. If the object distance is equal to or smaller than the first threshold distance, step 405b is performed.

Figure 6:
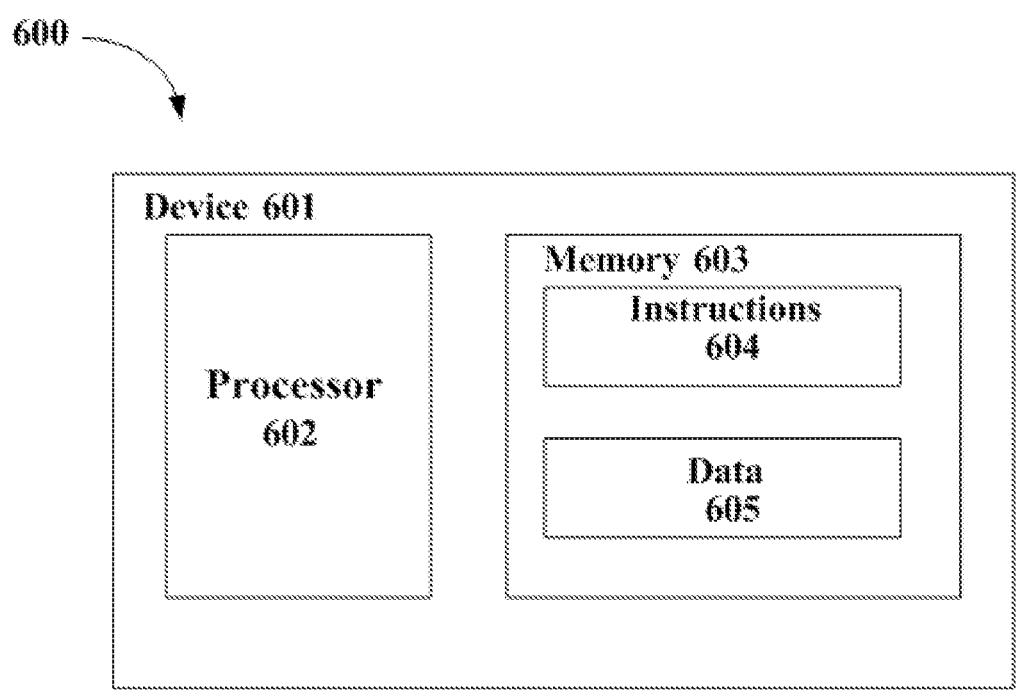
FIG. 6 depicts a schematic diagram of a device for identifying an object detected by a LiDAR device according to one embodiment of the present disclosure.

FIG. 6 depicts a schematic diagram of a device 601 for identifying an object detected by a LiDAR device according to one embodiment of the present disclosure. As shown in FIG. 6, the device 601 may include a processor 602 and a memory 603. The memory 603 of device 601 stores information accessible by the processor 602, including instructions 604 that may be executed by the processor 602. The memory 603 also includes data 605 that may be retrieved, processed or stored by the processor 602. The memory 603 may be of any type of tangible media capable of storing information accessible by the processor, such as a hard-drive, memory card, ROM, RAM, DVD, CD-ROM, write-capable, and read-only memories. The processor 602 may be any well-known processor, such as commercially available processors. Alternatively, the processor may be a dedicated controller such as an ASIC.

The instructions 604 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Data 605 may be retrieved, stored or modified by processor 602 according to the instructions 604. For example, although the system and method are not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data. In an example, the instructions 604 may be any set of instructions related to the processes from 200 to 500 as described before.

Although FIG. 6 functionally illustrates the processor and memory as being within the same block, the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Various embodiments have been described herein with reference to the accompanying drawings. It will, however, be evident that various modifications and changes may be made thereto, and additional embodiments may be implemented, without departing from the broader scope of the invention as set forth in the claims that follow.

Further, other embodiments will be apparent to those skilled in the art from consideration of the specification and practice of one or more embodiments of the invention disclosed herein. It is intended, therefore, that this disclosure and the examples herein be considered as exemplary only, with a true scope and spirit of the invention being indicated by the following listing of exemplary claims.

What is claimed is:

1. An object identifying method, comprising:
  acquiring detection data associated with a detection signal, wherein the detection data comprises a transmission time of the detection signal transmitted by a light detection and ranging ("LiDAR") device;
  acquiring reflection data associated with a reflection signal of the detection signal reflected by an object at an object distance from the LiDAR device, and the reflection data comprises a receipt time of the reflection signal and an intensity of the reflection signal; and
  determining whether the object is an interference by comparing the intensity of the reflection signal with a distance-dependent threshold intensity;
  wherein the method further comprising the following steps performed before the step of determining whether the object is an interference by comparing the intensity of the reflection signal with a distance-dependent threshold intensity:

determining the object distance based on the detection data and the reflection data; and comparing the object distance with a second threshold distance;

wherein determining whether the object is an interference by comparing the intensity of the reflection signal with a distance-dependent threshold intensity comprises:

in response to that the object distance is smaller than the second threshold distance, determining that the object is an interference when the intensity of the reflection signal is smaller than a first threshold intensity, wherein the first threshold intensity increases with increase in the object distance; and in response to that the object distance is equal to or greater than the second threshold distance and equal to or smaller than a first threshold distance, determining that the object is an interference when the intensity of the reflection signal is smaller than a second threshold intensity, wherein the second threshold intensity decreases with increase in the object distance;

wherein the first threshold intensity is calculated using the following equation: $I1=A1*D+B$, wherein $I1$ is the first threshold intensity, $A1$ is a first coefficient, $D$ is the object distance, and $B$ is a first preset value.

2. The method of claim 1, further comprising:

acquiring subsequent detection data associated with another detection signal subsequent to the detection signal, wherein the subsequent detection data comprises a transmission time of the another detection signal transmitted by the LiDAR device, and an angle between a first transmission direction of the detection signal and a second transmission direction of the another detection signal is not greater than 0.5 degree;

acquiring a subsequent reflection data associated with a reflection signal of the another detection signal reflected by a subsequent detected object at a subsequent object distance from the LiDAR device, and the subsequent reflection data comprises a receipt time of the reflection signal of the another detection signal reflected by the subsequent detected object;

determining the subsequent object distance based on the subsequent detection data and the subsequent reflection data, and in response to the subsequent object distance is the same as the object distance, determining that the object is not interference.

3. The method of claim 1, wherein the intensity of the reflection signal is an amplitude of the reflection signal, a pulse width of the reflection signal, or a combination thereof.

4. The method of claim 1, wherein the first threshold distance is from 0.1 meters to 30 meters.

5. The method of claim 1, wherein the second threshold intensity is calculated using the following equation: $I2=A2*(Dmax-D)+C$, wherein $I2$ is the second threshold intensity, $A2$ is a second coefficient, $Dmax$ is the first threshold distance, $D$ is the object distance, and $C$ is a second preset value.

6. The method of claim 1, wherein the LiDAR device comprises a transmitter and a receiver, and the second threshold distance is determined by a lateral distance between the transmitter and the receiver.

7. A device for identifying an object, comprising:
a processor; and
a memory configured to store an instruction executable by the processor;

wherein the processor is configured to:

acquire detection data associated with a detection signal, wherein the detection data comprises a transmission time of the detection signal transmitted by a light detection and ranging ("LiDAR") device;

acquire reflection data associated with a reflection signal of the detection signal reflected by an object at an object distance from the LiDAR device, and the reflection data comprises a receipt time of the reflection signal and an intensity of the reflection signal; and determine whether the object is an interference by comparing the intensity of the reflection signal with a distance-dependent threshold intensity;

wherein the processor is further configured to perform the following steps before the step of determining whether the object is an interference by comparing the intensity of the reflection signal with a distance-dependent threshold intensity:

determining the object distance based on the detection data and the reflection data; and comparing the object distance with a second threshold distance;

wherein the step of determining whether the object is an interference by comparing the intensity of the reflection signal with a distance-dependent threshold intensity comprises:

in response to that the object distance is smaller than the second threshold distance, determine that the object is an interference when the intensity of the reflection signal is smaller than a first threshold intensity, wherein the first threshold intensity increases with increase in the object distance; and in response to that the object distance is equal to or greater than the second threshold distance and equal to or smaller than a first threshold distance, determine that the object is an interference when the intensity of the reflection signal is smaller than a second threshold intensity, wherein the second threshold intensity decreases with increase in the object distance;

wherein the first threshold intensity is calculated using the following equation: $I1=A1*D+B$, wherein $I1$ is the first threshold intensity, $A1$ is a first coefficient, $D$ is the object distance, and $B$ is a first preset value.

8. The device of claim 7, wherein the processor is further configured to:

acquire subsequent detection data associated with another detection signal subsequent to the detection signal, wherein the subsequent detection data comprises a transmission time of the another detection signal transmitted by the LiDAR device, and an angle between a first transmission direction of the detection signal and a second transmission direction of the another detection signal is not greater than 0.5 degree;

acquire a subsequent reflection data associated with a reflection signal of the another detection signal reflected by a subsequent detected object at a subsequent object distance from the LiDAR device, and the subsequent reflection data comprises a receipt time of the reflection signal of the another detection signal reflected by the subsequent detected object;

determine the subsequent object distance based on the subsequent detection data and the subsequent reflection data, and in response to the subsequent object distance is the same as the object distance, determine that the object is not interference.

9. The device of claim 7, wherein the intensity of the reflection signal is an amplitude of the reflection signal, a pulse width of the reflection signal, or a combination thereof.

10. The device of claim 7, wherein the first threshold distance is from 0.1 meter to 30 meter.

11. The device of claim 7, wherein the second threshold intensity is calculated using the following equation: $I2=A2*(Dmax-D)+C$, wherein I2 is the second threshold intensity, A2 is a second coefficient, Dmax is the first threshold distance, D is the object distance, and C is a second preset value.

12. The device of claim 7, wherein the LiDAR device comprises a transmitter and a receiver, and the second threshold distance is determined by a lateral distance between the transmitter and the receiver.

13. A non-transitory computer readable storage medium having stored therein instructions that, when executed by a processor, causes the processor to perform a method of identifying an object, the method comprising:
  acquiring detection data associated with a detection signal, wherein the detection data comprises a transmission time of the detection signal transmitted by a light detection and ranging ("LiDAR") device;
  acquiring reflection data associated with a reflection signal of the detection signal reflected by an object at an object distance from the LiDAR device, and the reflection data comprises a receipt time of the reflection signal and an intensity of the reflection signal; and
  determining whether the object is an interference by comparing the intensity of the reflection signal with a distance-dependent threshold intensity;
  wherein the method further comprising the following steps performed before the step of determining whether the object is an interference by comparing the intensity of the reflection signal with a distance-dependent threshold intensity:
  determining the object distance based on the detection data and the reflection data; and
  comparing the object distance with a second threshold distance;
  wherein determining whether the object is an interference by comparing the intensity of the reflection signal with a distance-dependent threshold intensity comprises:
    in response to that the object distance is smaller than the second threshold distance, determining that the object is an interference when the intensity of the reflection signal is smaller than a first threshold intensity, wherein the first threshold intensity increases with increase in the object distance; and
    in response to that the object distance is equal to or greater than the second threshold distance and equal to or smaller than a first threshold distance, determining that the object is an interference when the intensity of the reflection signal is smaller than a second threshold intensity, wherein the second threshold intensity decreases with increase in the object distance;
  wherein the first threshold intensity is calculated using the following equation: $I1=A1*D+B$, wherein I1 is the first threshold intensity, A1 is a first coefficient, D is the object distance, and B is a first preset value.

* * * * *